(12) United States Patent
Huscher

(10) Patent No.: US 9,863,266 B2
(45) Date of Patent: Jan. 9, 2018

(54) WASTE HEAT RECOVERY SYSTEM FOR A POWER SOURCE

(71) Applicant: BORGWARNER INC., Auburn Hills, MI (US)

(72) Inventor: Frederick Huscher, Hendersonville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 133 days.

(21) Appl. No.: 14/946,447

(22) Filed: Nov. 19, 2015

(65) Prior Publication Data

US 2017/0145850 A1    May 25, 2017

(51) Int. Cl.
| | |
|---|---|
| *B60K 6/40* | (2007.10) |
| *B60K 6/48* | (2007.10) |
| *B60K 3/04* | (2006.01) |
| *B60W 10/08* | (2006.01) |
| *F01D 15/10* | (2006.01) |
| *F01K 7/16* | (2006.01) |
| *F01N 5/02* | (2006.01) |

(Continued)

(52) U.S. Cl.
CPC ............ *F01D 15/10* (2013.01); *F01K 7/16* (2013.01); *F01K 15/02* (2013.01); *F01K 23/06* (2013.01); *F01K 23/10* (2013.01); *F01N 5/02* (2013.01); *H02K 7/1823* (2013.01); *B60K 13/04* (2013.01)

(58) Field of Classification Search
CPC .. B60K 6/48; B60K 3/04; B60K 6/40; B60W 10/08
See application file for complete search history.

(56) References Cited

U.S. PATENT DOCUMENTS

| | | | |
|---|---|---|---|
| 4,104,535 A | 8/1978 | Bronicki | |
| 5,269,130 A * | 12/1993 | Finckh | F01K 23/108 |
| | | | 122/451 S |

(Continued)

FOREIGN PATENT DOCUMENTS

| | | |
|---|---|---|
| DE | 10 2010 054734 A1 | 6/2012 |
| FR | 3 004 487 A1 | 10/2014 |

(Continued)

OTHER PUBLICATIONS

International Search Report for related International Application No. PCT/US16/61017; report dated Feb. 20, 2017.

*Primary Examiner* — Bryan Evans
(74) *Attorney, Agent, or Firm* — Miller, Matthias & Hull LLP

(57) ABSTRACT

The present disclosure is directed to a waste heat recovery system used in conjunction with a power source system. A pump may pressurize a working fluid to a set pressure threshold and feed the working fluid through a fluid flow path. An evaporator and a condenser may each connect to the fluid flow path. Connected to each the evaporator and the condenser may be a turbine able to receive the working fluid when the working fluid is above the set pressure threshold and a predetermined thermal threshold. An electric machine having a motor mode or a generator mode may then attach to the turbine. Attached to the other end of the turbine may be a shaft coupling also attached to the pump. The pump may be powered by the electric machine operating in a motor mode through the shaft coupling to provide pressure to the waste heat recovery system.

16 Claims, 5 Drawing Sheets

(51) Int. Cl.
*H02K 7/18* (2006.01)
*F01K 15/02* (2006.01)
*F01K 23/06* (2006.01)
*F01K 23/10* (2006.01)
*B60K 13/04* (2006.01)

(56) References Cited

U.S. PATENT DOCUMENTS

| | | |
|---|---|---|
| 6,539,720 B2 | 4/2003 | Rouse et al. |
| 8,616,001 B2 | 12/2013 | Held et al. |
| 2004/0255591 A1 | 12/2004 | Hisanaga |
| 2005/0006957 A1 | 1/2005 | Bronicki |
| 2010/0181138 A1* | 7/2010 | Khadiya ................ F01N 3/023 180/301 |
| 2013/0036736 A1* | 2/2013 | Hart .................... G05D 7/0617 60/645 |

FOREIGN PATENT DOCUMENTS

| | | |
|---|---|---|
| WO | 2008124868 A1 | 10/2008 |
| WO | WO-2015/075301 A1 | 5/2015 |

\* cited by examiner

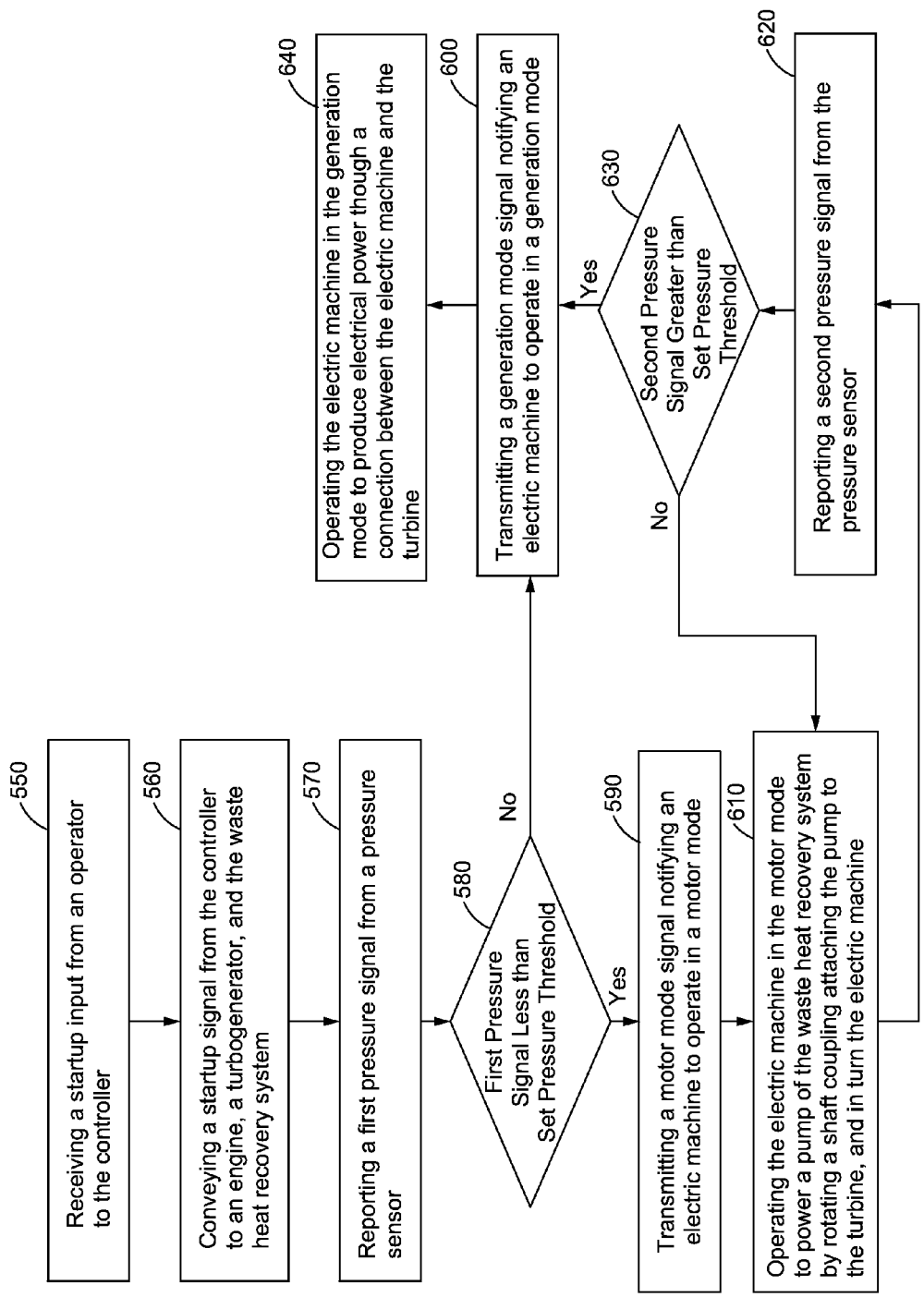

WASTE HEAT RECOVERY SYSTEM FOR A POWER SOURCE

FIELD OF DISCLOSURE

The present disclosure generally relates to a power source system and, more particularly, relates to a waste heat recovery system connected to the power source system.

BACKGROUND OF THE DISCLOSURE

As engines operate to produce thrust or power, heat is released as a byproduct of that production. Advancements in the power generation and transportation fields have found multiple ways to use this discarded heat for additional purposes. In one such use, heat produced by an engine may be fed into a recovery system.

Some of these recovery systems may include turbogenerators. Turbogenerators are a combination of a turbine and electric generator used for the generation of electric power. Excess heat produced within an engine can then be used to heat a medium which can then flow to power the turbogenerator. Turbogenerators are commonly used in the power generation industry, and are more commonly employed as auxiliary power units for vehicles such as aircraft, transportation trucks, and other types of engine-operated vehicles.

Recovery systems which employ turbogenerators for electric power generation operate under the principles of a thermal cycle. This thermal cycle may be a Rankine cycle. In the Rankine cycle, heat from an engine is supplied externally to a closed loop, which usually uses a working fluid. As the working fluid travels through the closed loop, the working fluid passes through all the components of the recovery system connected to the closed loop. Most of these recovery systems include a tank, a pump, an evaporator, a turbine, and a condenser through which the working fluid flows.

In an ideal recovery system, the pump would continuously feed the working fluid into the turbine for power generation. However, that is not always the case. For a recovery system containing the components listed above to operate correctly, the working fluid must flow at a significant pressure to spin the turbine of the turbogenerator. When the recovery system is in continuous operation, obtaining this pressure is easily achieved. However, during startup of such recovery systems, the initial pressure within the recovery system is low and this pressure value is not met. Therefore, external or additional power sources may be needed to power the pump to build up the working fluid pressure within the recovery system.

For operators of such recovery systems, it would be advantageous to develop a recovery system connected to a turbogenerator in which external or additional power sources are not needed to pressurize the recovery system into a continuously operational state.

SUMMARY OF THE DISCLOSURE

In one aspect of the disclosure, a waste heat recovery system for a power source system is disclosed. The waste heat recovery system may have a working fluid contained within the fluid flow path. A pump may connect to the fluid flow plant and pressurize the working fluid to a set pressure threshold while feeding the working fluid into the fluid flow path. The pump may connect to an evaporator able to heat the working fluid as to change the matter state of the working fluid. A condenser may connect to the evaporator to cool the working fluid as to change the matte state of the working fluid. Connected to each the evaporator and the condenser, a turbine may be present. The turbine connects to each the evaporator and the condenser through a second fluid flow path able to receive the working fluid when the working fluid is at or above a predetermined thermal threshold and a set pressure threshold. Additionally, an electric machine connects to the turbine. The electric machine may have a motor mode and a generator mode determined by an operation signal sent from a controller. Finally, a shaft coupling may connect the turbine to the pump and in turn the electric machine by way of the turbine. The shaft coupling is able to power the pump through the electric machine when the electric machine operates in the motor mode.

In another aspect of the disclosure, a vehicle is disclosed. The vehicle may have a frame, and an operator station supported by the frame. Additionally, the work machine may have a drive system operatively connected to a brake system and a power source system. The power source system may have a waste heat recovery system, an engine and a turbogenerator. The waste heat recovery system may have a working fluid contained within the fluid flow path. A pump may connect to the fluid flow path and pressurize the working fluid to a set pressure threshold while feeding the working fluid into the fluid flow path. The pump may connect to an evaporator able to heat the working fluid so as to change the matter state of the working fluid. A condenser may connect to the evaporator to cool the working fluid so as to change the matter state of the working fluid. Connected to each the evaporator and the condenser, a turbine may be present. The turbine connects to each the evaporator and the condenser through a second fluid flow path able to receive the working fluid when the working fluid is at or above a predetermined thermal threshold and a set pressure threshold. Additionally, an electric machine connects to the turbine. The electric machine may have a motor mode and a generator mode determined by an operation signal sent from a controller. Finally, a shaft coupling may connect the turbine to the pump and in turn the electric machine by way of the turbine. The shaft coupling is able to power the pump by way of the electric machine when the electric machine operates in the motor mode.

In yet another aspect of the disclosure, a method to operate a waste heat recovery system for a power source system is disclosed. First, a startup input is received from an operator of the power source system to a controller connected to the power source system. Then, a startup signal is conveyed from the controller to an engine, a turbogenerator, and the waste heat recovery system of the power source system. Next, a first pressure signal is reported from a pressure sensor connected to the waste heat recovery system to the controller. The controller then determines if the first pressure signal indicates the pressure with the waste heat recovery system is less than a set pressure threshold, and if true transmits a motor mode signal notifying an electric machine to operate in a motor mode. The electric machine then operates in a motor mode to power a pump of the waste heat recovery system by rotating a shaft coupling attaching the pump to a turbine. Then, a second pressure signal is reported from the pressure sensor connected to the waste heat recovery system to the controller. The controller determines if the second pressure signal indicates the pressure within the waste heat recovery system is greater than the set pressure threshold, and if true transmits a generation mode signal notifying the electric machine to operate in a generation mode. Finally, the electric machine operating in a generation mode produces electrical power through a connection between the electric machine and the turbine.

These and other aspects and features of the present disclosure will be more readily understood when reading the following detailed description taken in conjunction with the accompanied drawings.

BRIEF DESCRIPTION OF THE DRAWINGS

FIG. 5 is a flow chart showing a method of operating the waste heat recovery system in accordance with an embodiment of the present disclosure.

It should be understood that the drawings are not necessarily to scale and that the disclosed embodiments are illustrated diagrammatically and in partial views. It should be further understood that this disclosure is not to be limited to the particular embodiments illustrated herein.

DETAILED DESCRIPTION OF THE EMBODIMENTS

The present disclosure provides for a waste heat recovery system 100 used in conjunction with a power source system 110. The waste heat recovery system 100 and power source system 110 may be part of a vehicle 120 or a standalone system connected to a non-transportation based engine. Examples of such vehicles 120 that might employ the waste heat recovery system 100 and the power source system 110 include, but are not limited to: vehicles used for transportation such as trucks and automobiles; work machines such as construction machines; marine vessels; recreational vehicles; or military or police transportation vehicles. Those skilled in the art will understand that the strategy in accordance with the present disclosure may be implemented in other types of useful scenarios as well. Moreover, references to various elements described herein, are made collectively or individually when there may be more than one element of the same type. However, such reference are rendered to merely aid the reader's understanding of the present disclosure and to be considered as exemplary. Accordingly, it may be noted that any such reference to elements in the singular is also to be construed to relate to the plural and vice versa without limiting the scope of the disclosure to the exact number or type of such elements unless set forth explicitly in the presented claims.

Figure 1:
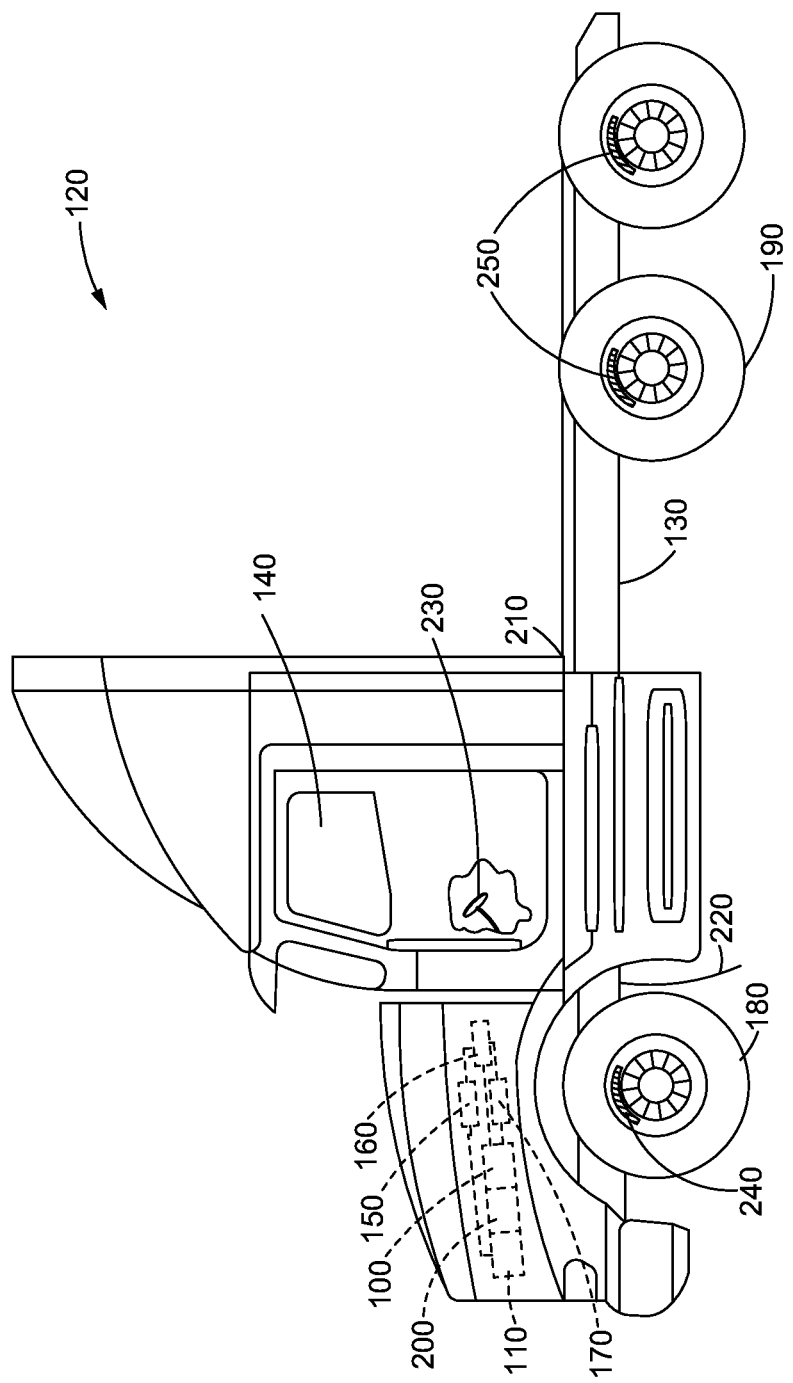
FIG. 1 is a side view of a vehicle having a power source and waste heat recovery system in accordance with an embodiment of the present disclosure.

Referring now to the drawings and with specific reference to FIG. 1, a vehicle 120 is presented. The vehicle 120 may be a mobile machine that performs some type of operation associated with an industry, such as mining, construction, farming, transportation, or any other industry known to use vehicles 120. In different embodiments, the vehicle 120 may be an on-highway vehicle such as a truck (depicted in FIG. 1), an automobile, a construction vehicle, or any other vehicle 120 known in the art. The vehicle 120, as viewed in FIG. 1, includes a frame 130, an operator station 140, the power source system 110, a drive system 150, a brake system 160, a controller 170, and a waste heat recovery system 100.

The frame 130 may include any structural member or assembly of members that may support movement of the vehicle 120. Additionally, the frame 130 may be positioned to support the operator station 140. The operator station 140 may contain controls necessary to operate the vehicle 120. The input devices may be adapted to receive input from the user operator to indicate the desired machine movement. These input devices may include a steering wheel, switches, knobs, or other known devices that are located proximate to the operator seat within the operator station 140. Furthermore, these input devices may be configured to generate and transmit control signals to the controller 170 of the vehicle 120. These control signals may indicate a performance of the vehicle 120 such as acceleration and deceleration, as well as signals indicating operation of other vehicle systems connected to the controller 170.

The power source system 110 may also be supported by the frame 130 of the vehicle 120. The power source system 110 may be an engine, such as a diesel engine, a gasoline engine, a gaseous fuel-powered engine, a natural gas engine, or any other engine for use on a vehicle 120. Alternatively, the power source system 110 may consist of a non-combustion source of power, such as a fuel cell, a power storage device, or another suitable power source. The power source system 110 may produce mechanical or electrical power output that may be converted to power other systems of the vehicle 120. For example, the power source system 110 may power the drive system 150 that itself may include a pair of front wheels 180 and a plurality of rear wheels 190, positioned to support the vehicle 120. The front wheels 180 and the plurality of rear wheels 190 may be rotated to steer and maneuver the vehicle 120 in both a forward and reverse direction. The power source system 110 may be connected to a turbogenerator 200 which may provide additional power to the vehicle 120 or the power source system 110.

Additionally, the waste heat recovery system 100 may be connected to or be in communication with the power source system 110. In an embodiment of the present disclosure, the waste heat recovery system 100 is located within the frame 130 of the vehicle 120 in close proximity to the power source system 110. However, in other additional embodiments the waste heat recovery system 100 may be located in other locations on the vehicle 120 such as, but not limited to, the rear portion 210 of the frame 130 or attached to the underside 220 of the frame 130. The waste heat recovery system 100 will be described in greater detail in the following paragraphs.

The vehicle 120 further includes the brake system 160 which may be operatively connected to the controller 170. The brake system 160 may be configured to decelerate the movement of the vehicle 120 when the vehicle 120 is in motion. Furthermore, the controller 170 may be operatively connected to the power source system 110, the drive system 150, the brake system 160, and the operator station 140. The controller 170 may also be adapted to receive signals from input devices (not shown) associated with the operator station 140. The controller 170 may monitor and provide appropriate output signals to various systems to control the movement of the vehicle 120 and preform various other functions and tasks during operation.

Additionally, like the drive system 150, the brake system 160 may be associated with the front wheels 180 and the plurality of rear wheels 190. The brake system 160 may further be operable with other input devices such as a brake pedal 230 within the operator station 140. The brake system 160, in an embodiment of the present disclosure, may be hydraulically driven or driven by pressurized air and include front brakes 240 and rear brakes 250. The front brakes 240 and rear brakes 250 may be operatively associated with the respective front wheels 180 and the plurality of rear wheels 180 of the vehicle 120. In one embodiment of the present disclosure, each of the front brakes 240 and the rear brakes 250 may include an actuated wheel brake, such as a disk brake or a drum brake. The front brakes 240 and the rear brakes 250 may be disposed intermediate to the front wheels 180 and the plurality of rear wheels 190. When actuated, the front brakes 240 and the rear brakes 250 may increase the rolling friction of the vehicle 120, which slows the movement of the vehicle 120. The front brakes 240 and the rear brakes 250 may be operated by an input, such as but not limited to the brake pedal 230 positioned within the operator station 140. As an operator depresses the brake pedal 230 along a braking range, pressure may be directed to the actuators controlling the front brakes 240 and the rear brakes 250. The degree of depression by the brake pedal 230 proportionally controls the pressure supplied to each the actuators of the front brakes 240 and the rear brakes 250.

Figure 2:
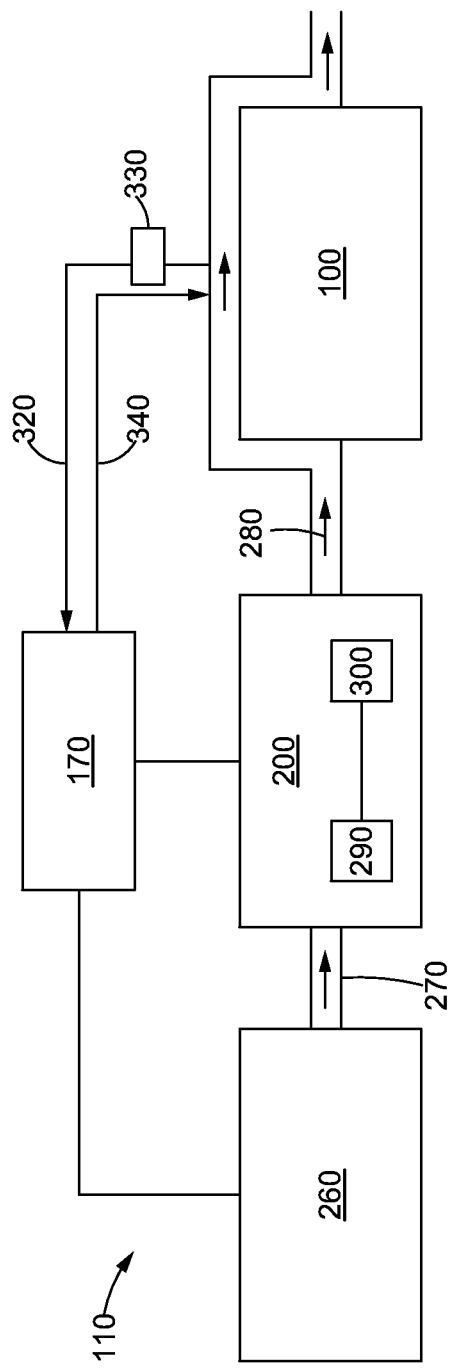
FIG. 2 is a schematic diagram of an exemplary power source system in accordance with an embodiment of the present disclosure.

Referring now to FIG. 2, the power source system 110 is viewed in greater detail showing its interconnection with the other systems of the vehicle 120. The power source system 110 may include an engine 260, which may be an internal combustion engine such as a reciprocating piston engine, a gas turbine engine, a spark ignition engine or any other compression ignition engine known in the art. In an embodiment of the present disclosure, the engine 260 may be a compression ignition engine such as a diesel engine commonly used to power the vehicle 120 viewed in FIG. 1.

The power source system 110 may also include an exhaust conduit 270 downstream and in fluid communication with the engine 260. The exhaust conduit 270 may be configured to transport an exhaust stream 280 away from the engine 260 when the engine 260 is in operation. Additionally, as viewed in FIG. 2, the power source system 110 may include a turbogenerator 200 as part of the waste heat recovery system 100. The turbogenerator 200 may be configured to have a turbine 290 and an electric machine 300 in communication with one another. Although a turbine 290 is used in an embodiment of the present disclosure as the expansion device, it should be understood to one skilled in the art that other expansion devices such as but not limited to a scroll, gear, or piston expanders may be coupled to the electric machine 300 and a pump. The term "turbogenerator" is used as an exemplary embodiment of such an expansion device connected to an electric machine and may include other expender device architectures as well.

The power source system 110 may also include a waste heat recovery system 100. The waste heat recovery system 100 may be in thermal communication with the exhaust stream 280 along the exhaust conduit 270. The controller 170 of the vehicle 120 or machine may be located outside of the power source system 110 yet able to connect to the individual components of the power source system 110. The controller 170 may be in operative communication with each the engine 260, the turbogenerator 200, and the waste heat recovery system 100. The controller 170 may be any type of electronic processor such as, but not limited to, a dedicated processor operable to send and receive electronic information, commands, and signals. If connected to the engine 260, the controller 170 may be able to send and receive electronic information relating to the operational health and efficiency of the engine 260. In the same regard, the controller 170 may be connected to the turbogenerator 200 to send and receive electronic information relating to the operational performance and state of the turbogenerator 200. Additionally, the controller 170 may be connected to the waste heat recovery system 100. If connected to the waste heat recovery system 100, the controller 170 may be able to receive a working fluid pressure signal 320 from a working fluid sensor 330 connected to the waste heat recovery system 100. In the same regard, the controller 170 may send to the waste heat recovery system 100 operational information in the form of a working fluid flowrate adjustment signal 340 to change and modify the operation of the waste heat recovery system 100 based on the information received by the controller 170. In the depicted embodiment of the present disclosure, the controller 170 may be a common controller connected to multiple systems of the vehicle 120. However, in other additional embodiments, the controller 170 may be a stand-alone device specifically associated with the waste heat recovery system 100.

Figure 3:
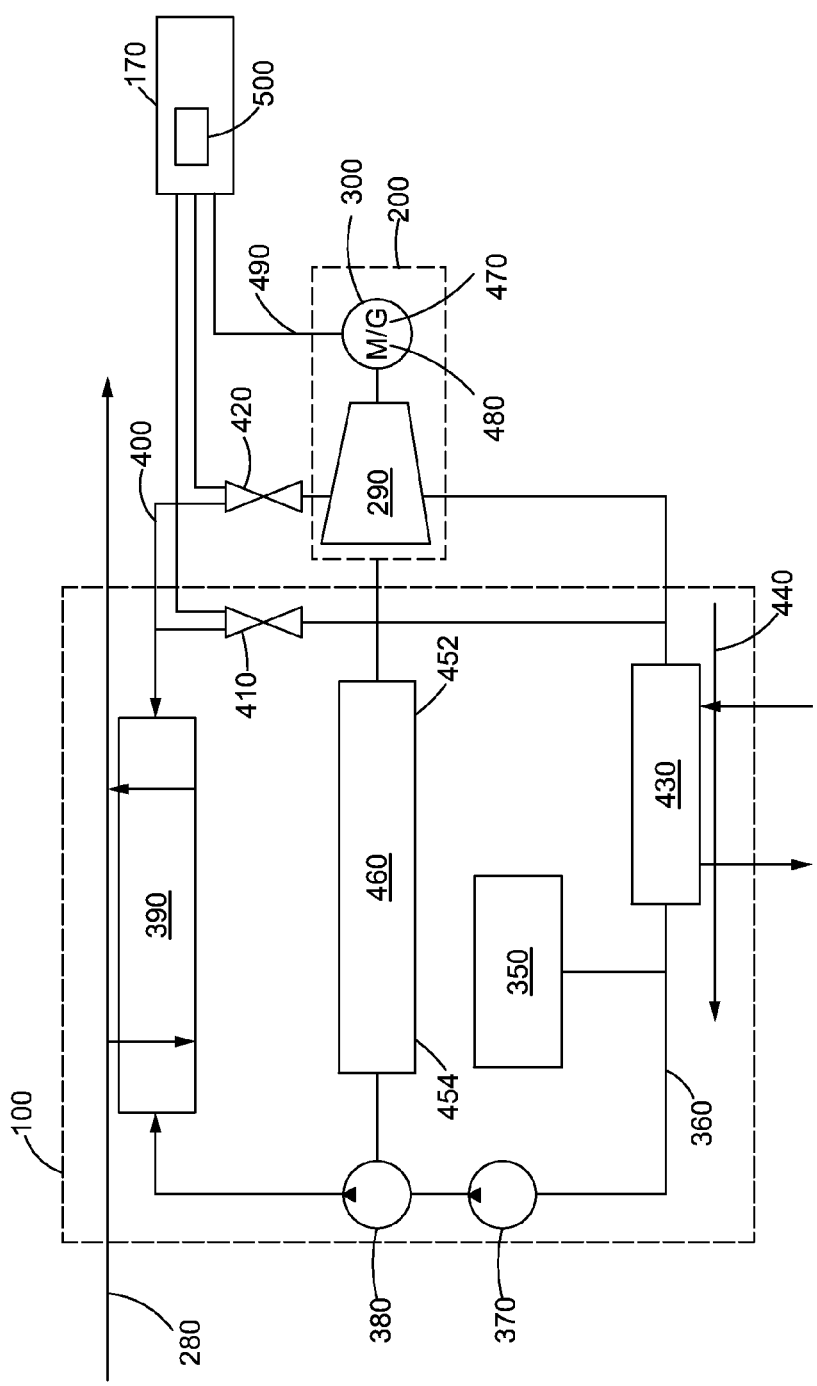
FIG. 3 is a schematic diagram of the waste heat recovery system in accordance with an embodiment of the present disclosure.

Turning now to FIG. 3, an exemplary waste heat recovery system 100 is connected to a turbogenerator 200 and viewed in schematic form. On the left side of the schematic the waste heat recovery system 100 is depicted in greater detail. As will be noted, the waste heat recovery system 100 may include a tank 350 to contain a working fluid. The tank 350 may be optional depending on the operational conditions and space provided for the waste heat recovery system 100. The working fluid may be any type of fluid that can transform from a liquid state to a gaseous state and flow through a fluid flow path 360 of the waste heat recovery system 100. For example, the working fluid may be water. Furthermore, the working fluid may be an organic fluid such as n-pentane, ethanol, or toluene or the like. The working fluid may be stored within the tank 350 for use within the waste heat recovery system 100. When the waste heat recovery system 100 is in operation the working fluid may travel out of the tank 350 and follow the fluid flow path 360 through the waste heat recovery system 100. When the working fluid has completed its cycle around the fluid flow path 360, the working fluid may then return to the tank 350 to be stored until it is needed again. During operation of the waste heat recovery system 100, the working fluid constantly moves through the fluid flow path 360. As the fluid flow path 360 is a closed loop, the working fluid continuously travels during operation of the waste heat recovery system 100 until the waste heat recovery system 100 terminates operation.

Referring again to FIG. 3, downstream of the tank 350 a first pump 370 may be provided. This first pump 370 may be a low pressure boost pump. The working fluid may follow along the fluid flow path 360 and enter the first pump 370. Within the first pump 370, the working fluid enters a first stage of pressurization in which pressure of the working fluid is increased to a first pressure stage. When the working fluid within the first pump 370 reaches the first pressure stage, the working fluid exits the first pump 370 through the fluid flow path 360 and enters a second pump 380.

The second pump 380 may be a high pressure feed pump. The working fluid, after leaving the first pump 370 at the first pressure stage, will then enter the second pump 380 where the pressure of the working fluid will once again be increased by the waste heat recovery system 100. Within the second pump 380 the working fluid is pressurized to a second pressure stage during a second stage of pressurization. When the working fluid has reached the second stage of pressurization, the working fluid leaves the second pump 380 and continues along the fluid flow path 360.

The second pump 380 in turn feeds the pressurized working fluid into an evaporator 390. The evaporator 390 is in thermal contact with the exhaust stream 280 flowing from the engine 260. The evaporator 390 utilizes the heat from the exhaust stream 280 to heat the pressurized working fluid within the evaporator 390. Within the evaporator 390, the working fluid may change from a liquid to a gaseous state as the heat causes the working fluid to evaporate. As the working fluid changes matter states, the working fluid rises to a predetermined thermal threshold. After the working fluid has been heated, the working fluid leaves the evaporator 390.

Depending on the matter state of the working fluid, the working fluid may either continue along the fluid flow path 360 of the waste heat recovery system 100, or travel down an evaporated fluid flow path 400 and enter the turbogenerator 200. If the working fluid leaving the evaporator 390 is still in a liquid state, the working fluid may continue along the fluid flow path 360 and through a first control valve 410. The first control valve 410 may be operable only at certain working fluid thermal states. For example, the first control valve 410 may have a set pressure and temperature threshold to allow the flow of the working fluid to pass only if the working fluid is at or below the set pressure and temperature threshold. The first control valve 410 may be actuated by the controller 170 through communication signals received through its connection to the controller 170.

During startup and shutdown operation of the waste heat recovery system 100, the second pump 380, may not be able to bring the working fluid up to a pressure level at which the evaporator 390 can change the matter state of the working fluid. Additionally, the exhaust stream 280 may not be hot enough to evaporate the working fluid flowing through the evaporator 390 to bring the working fluid up to the predetermined thermal threshold during these startup and shutdown times. Because of this, the set pressure threshold may be set at the second pressure stage of the second pump 380. In other words, if the working fluid leaving the evaporator 390 is at an insufficient thermal state as compared to a certain threshold, the fluid will travel through control valve 410 and continue along the fluid flow path 360. However, if the working fluid leaving the evaporator 390 at the predetermined thermal threshold and is at a sufficient thermal state, the working fluid may not travel through the first control valve 410 and may then travel though the evaporated fluid flow path 400 and enter the turbogenerator 200.

As the working fluid travels along the evaporated fluid flow path 400, the majority of the working fluid will have converted from a liquid to a gaseous state within the evaporator 390. Along the evaporated fluid flow path 400, the working fluid may enter a second control valve 420. The second control valve 420 may operate similar to the first control valve 410, but produce the opposite results. If the working fluid leaving the evaporator 390 is at a pressure value greater than the thermal state threshold of the second pressure stage, the working fluid may travel through the second control valve 420 and continue along the evaporator fluid flow path 400 into the turbine 290 of the turbogenerator 200. The second control valve 420 may be actuated by the controller 170 through communication signals received through its connection to the controller 170. However, if the working fluid leaving the evaporator 390 is at a thermal state lower than the set threshold of the second pressure stage, the working fluid may not travel through the second control valve 420 and may then travel though the first control valve 410 within the waste recovery system 100.

Working fluid that travels through the first control valve 410 continues along the fluid flow path 360 and may enter a condenser 430. Within the condenser 430, the working fluid that has been heated within the evaporator 390 and changed matter states may return to its original liquid state by cooling occurring within the condenser 430. Just as the evaporator 390 is in thermal contact with a heat source, the condenser 430 is in thermal contact with a cooling source 440. This cooling source 440 may be any type of thermal cooling source including, but not limited to, a cooling medium flowing through a cooling conduit, ambient air, or mechanically cooled air. After the working fluid has been cooled and returned to the liquid state, the working fluid flows out of the condenser 430 and back into the tank 350 from which the working fluid originated.

Still referring to FIG. 3, if the working fluid has reached the predetermined thermal threshold to follow the evaporated fluid flow path 400, the working fluid passes through the second control valve 420 to enter the turbogenerator 200. More specifically, the heated working fluid (which may be in a gaseous state) may enter a turbine 290 of the turbogenerator 200. The turbine 290 may have a plurality of turbine blades 440 equally displaced around a central axis 450. As the working fluid enters the turbine 290, the working fluid, which may be gaseous and highly pressurized, contacts the plurality of turbine blades 440 causing the plurality of turbine blades 440 to rotate around the central axis 450. After spinning the plurality of turbine blades 440, the working fluid may then exit the turbine 290 and flow back into the condenser 430 of the waste heat recovery system 100.

The turbine 290 of the turbogenerator 200 may be connected at one end 452 to a shaft coupling 460. The shaft coupling 460 connects the turbine 290 to the second pump 380, or high pressure feed pump, of the waste heat recovery system 100. For the second pump 380 to provide pressure, the second pump 380 must be provided with power to spin a centrifugal pump. By connecting the shaft coupling 460 to both the second pump 380 and the turbine 290, the turbine 290, when in operation, can provide such power to the second pump 380. The turbine 290 rotates the shaft coupling 460 which in turn powers the second pump 380. Therefore, when the power source system 110 is operational, the turbine 290 powers the second pump 380 to provide continuous pressure to the fluid flow path 360, and in turn powers itself for energy generation.

At a second end 454 of the turbine 290, the turbine 290 connects to an electric machine 300. The electric machine may have a rotor and a stator. When the turbine 290 is in operation, this connection feeds mechanical energy to the electric machine 300 allowing the electric machine 300 to rotate and produce electrical power. In a generation mode 470, the electric machine 300 may produce AC (alternating current) or DC (direct current) power dependent on the system or components to which the electric machine 300 is connected. Furthermore, the electric machine 300 may also act as electric motor. To act an electric motor, the electric machine 300 may pull power from the controller 170 of the vehicle 120 or machine to operate the electric machine 300. When in a motor mode 480 of operation, the electric motor of the electric machine 300 may rotate the connection to the turbine 290, which in turn connects to the shaft coupling 460 connected to the second pump 380. Acting as an electric motor, the electric machine 300 may provide power to the second pump 380 through such a connection. This may allow for the second pump 380 to pressurize the waste heat recovery system 100 to the second pressure stage, so that the turbine 290 may become operational. The electric machine 300 may act as an electric motor at the startup and shutdown sequences of the waste heat recovery system 100. In significant improvement to prior art approaches, the electric machine 300, acting as an electric motor, removes the need for additional pumps to augment the second pump 380 pressurizing the waste heat recovery system 100 when insufficient turbine power exists. The electric machine 300 is allowed to act as an electric motor under such conditions since the second control valve 420 will halt the flow of the working fluid to the turbine 290 in these startup and shutdown sequences as the thermal state of the working fluid within the waste heat recovery system 100 will be less than the set threshold of the second pressure stage and the working fluid will not have reached the predetermined thermal threshold.

The electric machine 300 may connect to the controller 170 through an electronic connection 490. This electronic connection 490 may be able to send and receive power from the controller 170 dependent or whether the electric machine 300 is operating in a generation mode 470 or a motor mode 480. A bi-directional power controller 500 may be present within the controller 170 to achieve this control and operation. Additionally, the controller 170 may transmit communication operational signals to the electric machine 300 to notify the electric machine 300 indicating the desired mode of operation. For example, when an operator of the vehicle 120 starts the vehicle the power source system 110 along with the engine 260, turbogenerator 200, and waste heat recovery system 100, is activated. As the waste heat recovery system 100 will not be pressurized at startup, the bi-directional controller 500 may command the electric machine 300 to work in a motor mode 480. During this motor mode 480, the electric machine 300 may power the second pump 380 through the shaft coupling 460 to bring the waste heat recovery system 100 up to the set pressure threshold of the second pressure stage. Once the waste heat recovery system 100 reaches the set pressure threshold of the second pressure stage, the second control valve 420 will open to allow the working fluid to flow into the turbine 290. At this point, the bi-directional power controller 500 may then send an additional signal to the electric machine 300 to cease operation in the motor mode 480 and switch to a generation mode 470. While in the generation mode 470, the electric machine 300 will receive mechanical energy from the turbine 290 to produce electrical power which can then in turn be sent back to the controller 170 for distribution throughout the machine or vehicle 120. Additionally, mechanical energy from the turbine 290 will be used to provide power to the pump 380 via the shaft coupling 460.

Figure 4:
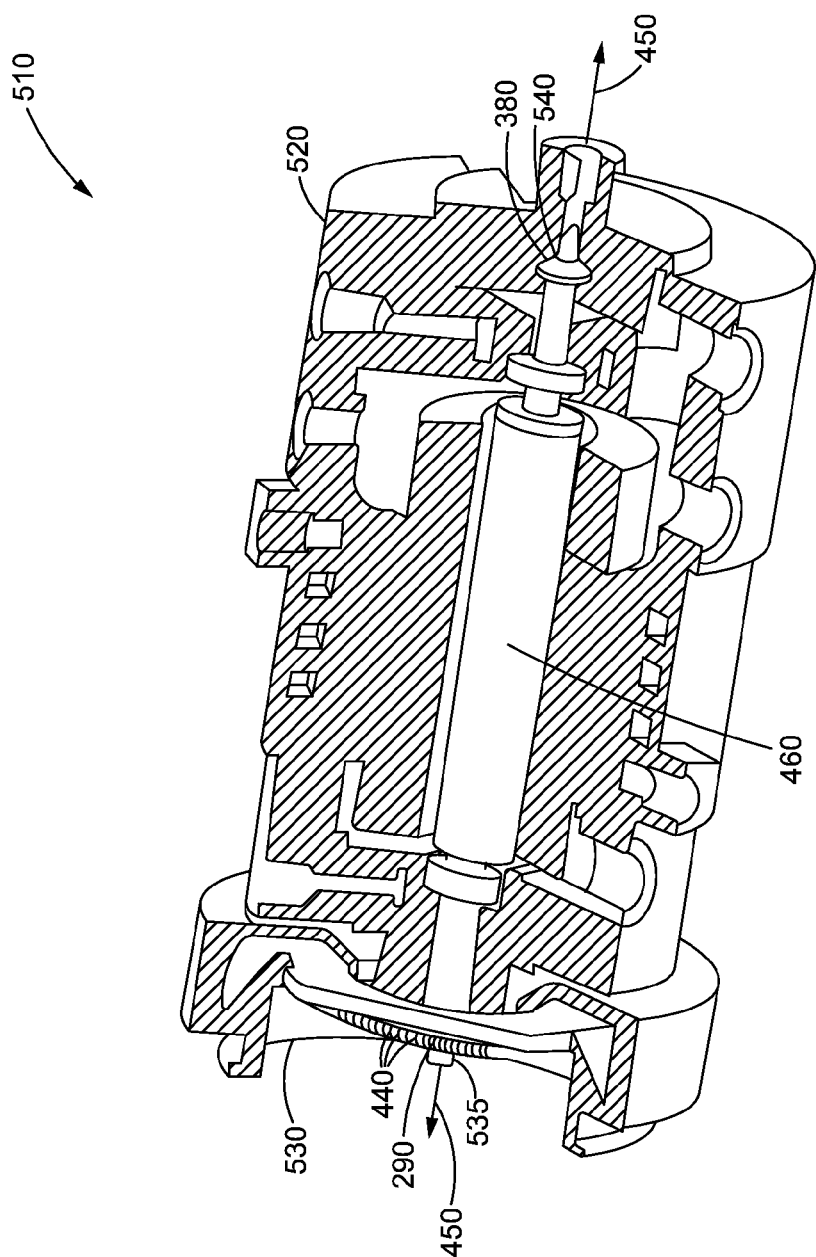
FIG. 4 is a cut-away, cross-sectional view of the turbogenerator in accordance with an embodiment of the present disclosure.

Referring now to FIG. 4, a cut-out cross-sectional view of the turbogenerator 200 and waste heat recovery system 100 within a mechanical device 510 which may be employed within the machine or vehicle 120 is depicted. The mechanical device 510 may have a housing 520 to hold components of both the turbogenerator 200 and the waste heat recovery system 100. At one end of the housing 520, the turbine 290 is rotatably mounted within a turbine casing 530. The turbine 290, as depicted, includes the plurality of turbine blades 440 radially extending from a shaft 535 and mounted for rotation about the central axis 450. The electric machine 300 may then connect to the turbine 290 outside of the casing 520. On the other end of the housing 520, the second pump 380 is mounted within a pump compartment 540. The shaft coupling 460 connects the turbine 290 to the second pump 380 and travels along the central axis 450. As the turbine 290 rotates about the central axis 450, the turbine 290 turns the shaft coupling 460 and powers the second pump 380. Additionally the electric machine 300, though its connection to the turbine 290, can power the second pump 380 by rotating the shaft coupling 460 along this central axis 450 when the electric machine 300 operates in a motor mode 480.

INDUSTRIAL APPLICABILITY

From the foregoing, it may be appreciated that the waste heat recovery system for a power source disclosed herein may have applicability in a variety of industries such as, but not limited to, use in machines or vehicles of any type which employ a power source producing heat and having the need for addition power which may be recovered from said heat. Furthermore, the waste heat recovery system for the power source may be used in any industrial system where an engine may produce heat waste to be recovered, thereby improving the efficiency of the machine or vehicle. One such industry where such a waste heat recovery system may be beneficial is the transportation industry. For example, use of a waste heat recovery system within trucks and the like may lead to greater fuel efficiency. As more engine heat is recovered as operational power through such a system, less fuel is needed to power the engine of the vehicle. Furthermore, such a waste heat recovery system is beneficial in that no additional outside power source, pump, or other components are needed to assist the high pressure pump of the waste heat recovery system during times sufficient fluid power or working fluid quality does not exist to power the pump using the turbine alone. This leads to a more compact and efficient design, allowing the waste heat recovery system to use less space in congested areas such as the engine compartment of transportation vehicles. The use of no outside components, smaller spatial requirements, and lower fuel consumption leads to economic savings for both the operators and owners of vehicles or machines employing the waste heat recovery system for a power source.

Moreover, the waste heat recovery system for a power source can be employed in any type of industry that facilitates the use of machines producing heat. Such industries may include transportation (as stated above), mining, construction, marine, farming, police and military work machines, recreational off-road machines, rail, agriculture, shipbuilding equipment, drainage and sewer maintenance machines, underwater maintenance machines, large scale power generation equipment, small auxiliary power generation equipment, or any like environment in which a machine having an engine produces heat as a byproduct.

An exemplary method of operating the waste heat recovery system 100 according to the present disclosure is shown in flow chart format within FIG. 5. As shown in a block 550, the method may begin with the controller 170 receiving a startup input from an operator. The controller 170 may be part of a machine or part of the vehicle 120 as seen in FIG. 1. The startup input may be a knob or switch connected to the controller 170 and is operable to send a startup signal to the power source system 110. Then in block 560, the controller 170 conveys the startup signal to each the engine 260, the turbogenerator 200 and the waste heat recovery system 100 of the power source system 110.

Next, in block 570, a working fluid pressure sensor 330 reports a pressure signal 320 to the controller 170, thereby informing the controller 170 of the pressure within the waste heat recovery system 100. The pressure of the waste heat recovery system 100 is compared against the set pressure threshold of the waste heat recovery system 100 in block 580. If the pressure signal 320 indicates that the pressure of the waste heat recovery system 100 is less than a set pressure threshold, the controller 170 sends a motor mode signal to the electric machine 300 of the turbogenerator 200 in block 590. However, if the pressure signal 320 indicates that the pressure of the waste heat recovery system 100 is greater than a set pressure threshold, the controller 170 sends a generator mode signal to the electric machine 300 of the turbogenerator 200 as seen in block 600. Either the motor mode signal or the generation mode signal may be sent by the bi-directional power controller 500 contained within the controller 170 of the machine or vehicle 120. The motor mode signal of block 590 notifies the electric machine 300 to operate in a motor mode 480 as an electric motor. Operating the electric machine 300 in a motor mode 480 as seen in block 610, allows the electric machine 300 to spin the shaft coupling 460 connected to each the turbine 290 of the turbogenerator 200 as well as power the second pump 380 of the waste heat recovery system 100. By powering the second pump 380 of the waste heat recovery system 100, the electric machine 300 operating in the motor mode 480 increases the pressure within the waste heat recovery system 100.

Then in block 620, the working fluid pressure sensor 330 may send a second pressure signal to the controller 170. The second reported pressure of the waste heat recovery system 100 is compared against the set pressure threshold of the waste heat recovery system 100 in block 630. If the second pressure signal reports that the pressure within the waste heat recovery system 100 is greater than the set pressure threshold, a generator mode signal is set from the controller 170 to the electric machine 300 of the turbogenerator 200 as seen in block 600. However, if the second pressure signal reports that the pressure within the waste heat recovery system 100 is less than the set pressure threshold, the electric machine 300 continues to operate in the motor mode 480 of block 610. The generator mode signal sent in block 600 notifies the electric machine 300 to cease operation in the motor mode 480, if applicable, and switch to the generation mode 470. Finally, in block 640, the electric machine 300 operating in a generation mode 470 may rotate through its connection to the turbine 290 powering the electric machine 300 to produce electrical power.

While the foregoing detailed description addresses only specific embodiments, it is to be understood that the scope of the disclosure is not intended to be limited thereby. Rather, the breadth and spirit of this disclosure is intended to be broader than any of the embodiments specifically disclosed.

What is claimed is:

1. A waste heat recovery system for a power source system, the waste heat recovery system comprising:
   a working fluid contained within a fluid flow path;
   a pump connected to the fluid flow path, the pump adapted to pressurize the working fluid to a set pressure threshold and feed the working fluid into the fluid flow path;
   an evaporator connected to the pump through the fluid flow path, the evaporator adapted to heat the working fluid as to change a matter state of the working fluid;
   a condenser connected to the evaporator through the fluid flow path, the condenser adapted to cool the working fluid as to change the matter state of the working fluid;
   a turbine connected to each the evaporator and the condenser though a second fluid flow path, the second fluid flow path able to receive the working fluid when the working fluid is at or above the set pressure threshold and a predetermined thermal threshold;
   a controller operationally associated with the pump, evaporator, condenser, and turbine;
   an electric machine rotatably connected to a second end of the turbine, the electric machine having a motor mode and a generator mode, the motor mode or the generator mode determined by an operation signal sent from the controller; and
   a shaft coupling, the shaft coupling being disposed between the turbine and the pump such that the shaft coupling rotatably connects a first end of the turbine to the pump, the shaft coupling in turn connects to the electric machine through the turbine, the shaft coupling adapted to transfer power produced by the electric machine to the pump when the electric machine operates in the motor mode.

2. The waste heat recovery system of claim 1, wherein the pump includes a plurality of pumps, a first pump of the plurality of pumps being a low pressure boost pump and a second pump of the plurality of pumps being a high pressure feed pump connected to the shaft coupling.

3. The waste heat recovery system of claim 1, wherein a first control valve allows the working fluid to flow from the evaporator directly to the condenser, and a second control valve admits the working fluid to the turbine when a thermal state of the working fluid in the waste heat recovery system is sufficient to power to the turbine.

4. The waste heat recovery system of claim 1, wherein the controller includes a bi-directional power controller contained within the controller connected to the power source system.

5. The waste heat recovery system of claim 4, wherein the operation signal is a motor mode signal sent from the bi-directional power controller, the motor mode signal notifying the electric machine to operate in the motor mode and rotate the shaft coupling to power the pump when a working fluid thermal state is insufficient to power the turbine.

6. The waste heat recovery system of claim 4, wherein the operation signal is a generation mode signal sent from the bi-directional power controller, the generation mode signal notifying the electric machine to operate in the generator mode and rotate in response to the electric machine connection with the turbine to produce electrical power.

7. The waste heat recovery system of claim 1, wherein the operational signal transmitted from the controller activates the fluid flow path when the electric machine functions in the motor mode and activates the second fluid flow path when the electric machine functions in the generation mode.

8. A vehicle comprising:
   a frame;
   an operator station supported by the frame; and
   a power source system supported by the frame and adapted to power the vehicle, the power source system having an engine connected to a waste heat recovery system containing a turbogenerator, the waste heat recovery system having a working fluid contained within a fluid flow path, a pump connected to the fluid flow path, the pump adapted to pressurize the working fluid to a set pressure threshold and feed the working fluid into the fluid flow path, an evaporator connected to the pump through the fluid flow path, the evaporator adapted to heat the working fluid as to change a matter state of the working fluid, a condenser connected to the evaporator through the fluid flow path, the condenser adapted to cool the working fluid as to change the matter state of the working fluid, a turbine connected to each the evaporator and the condenser though a second fluid flow path, the second fluid flow path able to receive the working fluid when the working fluid is at or above the set pressure threshold and a predetermined thermal threshold, an electric machine connected to a second end of the turbine, the electric machine having a motor mode and a generator mode, the motor mode or the generator mode determined by an operation signal sent from a controller, and a shaft coupling being disposed between the turbine and the pump such that the shaft coupling rotatably connects a first end of the turbine to the pump, the shaft coupling in turn connects to the electric machine through the turbine, the shaft coupling able to transfer power produced by the electric machine to the pump when the electric machine operates in the motor mode.

9. The vehicle of claim 8, wherein the pump includes a plurality of pumps, a first pump of the plurality of pumps being a low pressure boost pump and a second pump of the plurality of pumps being a high pressure feed pump connected to the shaft coupling.

10. The vehicle of claim 8, wherein a first control valve allows the working fluid to flow from the evaporator directly to the condenser when a working fluid thermal state is not reached within the waste heat recovery system, and a second control valve allows the working fluid to flow to the turbine when the working fluid thermal state in the waste heat recovery system is sufficient to power to the turbine.

11. The vehicle of claim 8, wherein the controller includes a bi-directional power controller contained within the controller connected to the power source system.

12. The vehicle of claim 11, wherein the operation signal is a motor mode signal sent from the bi-directional power controller, the motor mode signal notifying the electric machine to operate in the motor mode and rotate the shaft coupling to power the pump when a working fluid thermal state is insufficient to power the turbine.

13. The vehicle of claim 11, wherein the operation signal is a generation mode signal sent from the bi-directional power controller, the generation mode signal notifying the electric machine to operate in the generator mode and rotate in response to electric machine connection with the turbine to produce electrical power.

14. The vehicle of claim 8, wherein the operational signal transmitted from the controller activates the fluid flow path when the electric machine functions in the motor mode and activates the second fluid flow path when the electric machine functions in the generation mode.

15. A method of operating a waste heat recovery system for a power source system, the method comprising:

defining a first fluid flow path and a second fluid flow path;

receiving a startup input from an operator of the power source system to a controller connected to the power source system;

conveying a startup signal from the controller to an engine, a turbogenerator, and the waste heat recovery system of the power source system;

reporting a first pressure signal from a pressure sensor connected to the waste heat recovery system to the controller;

determining within the controller if the first pressure signal indicates the pressure within the waste heat recovery system is less than a set pressure threshold and if true, the controller transmitting a motor mode signal notifying an electric machine to operate in a motor mode;

activating the first fluid flow path based on receiving the motor mode signal by the waste heat recovery system;

operating the electric machine in the motor mode to power a pump of the waste heat recovery system by rotating a shaft coupling attaching the pump to a turbine, the first fluid flow path being operational when the electric machine functions in the motor mode;

reporting a second pressure signal from the pressure sensor connected to the waste heat recovery system to the controller;

determining within the controller if the second pressure signal indicates the pressure within the waste heat recovery system is greater than the set pressure threshold and if true, the controller transmitting a generation mode signal notifying the electric machine to operate in a generation mode;

activating the second fluid flow path based on receiving the generation mode signal by the waste heat recovery system; and operating the electric machine in the generation mode to produce electrical power though a connection between the electric machine and the turbine, the second fluid flow path being operational when the electric machine functions in the generation mode.

16. The method of claim 15, wherein the controller includes a bi-directional power controller to send the motor mode signal and the generation mode signal to the electric machine.

* * * * *